Aug. 10, 1948. P. G. POLHEMUS 2,446,989
AUTOMATIC HEAT CONTROLLED APPARATUS
FOR PREPARING PADS
Filed April 27, 1945 3 Sheets-Sheet 1
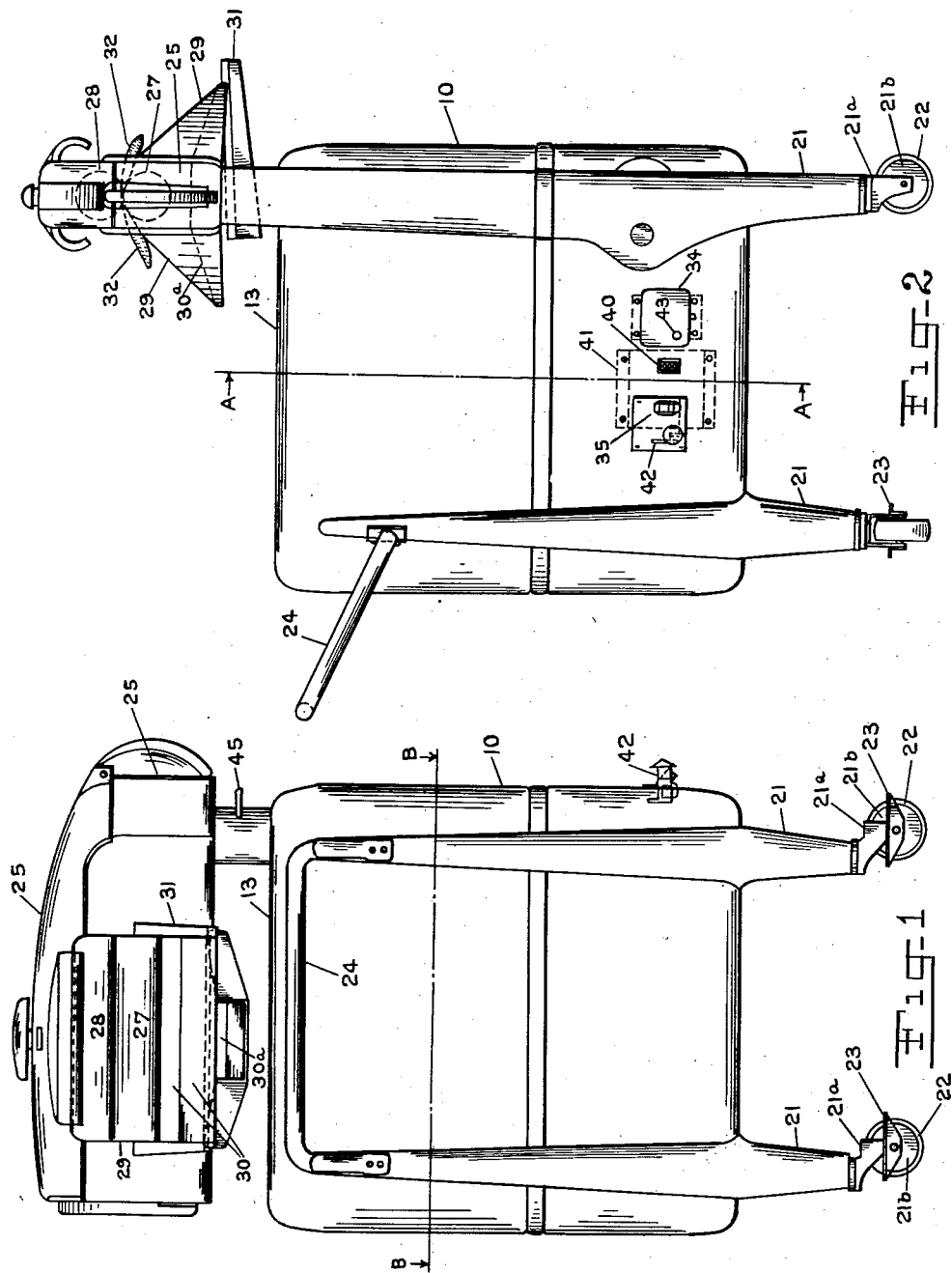
INVENTOR.
Peres G. Polhemus
BY
his attorney

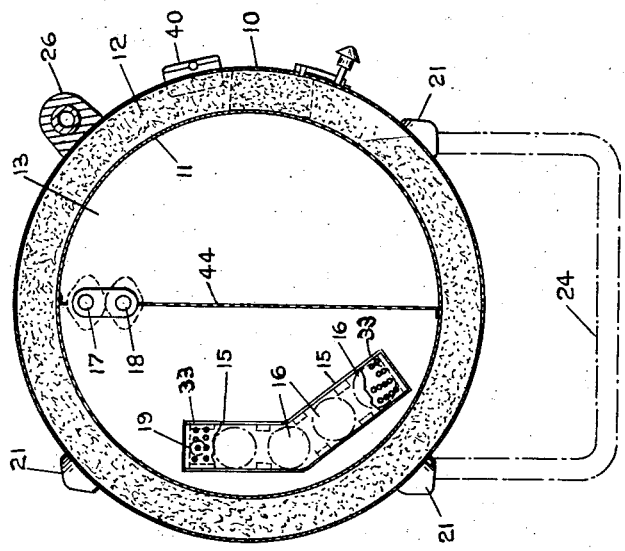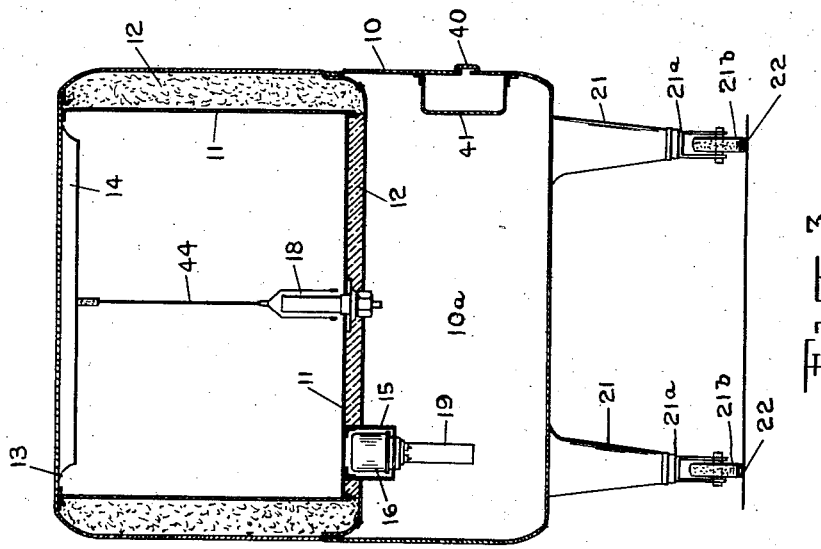

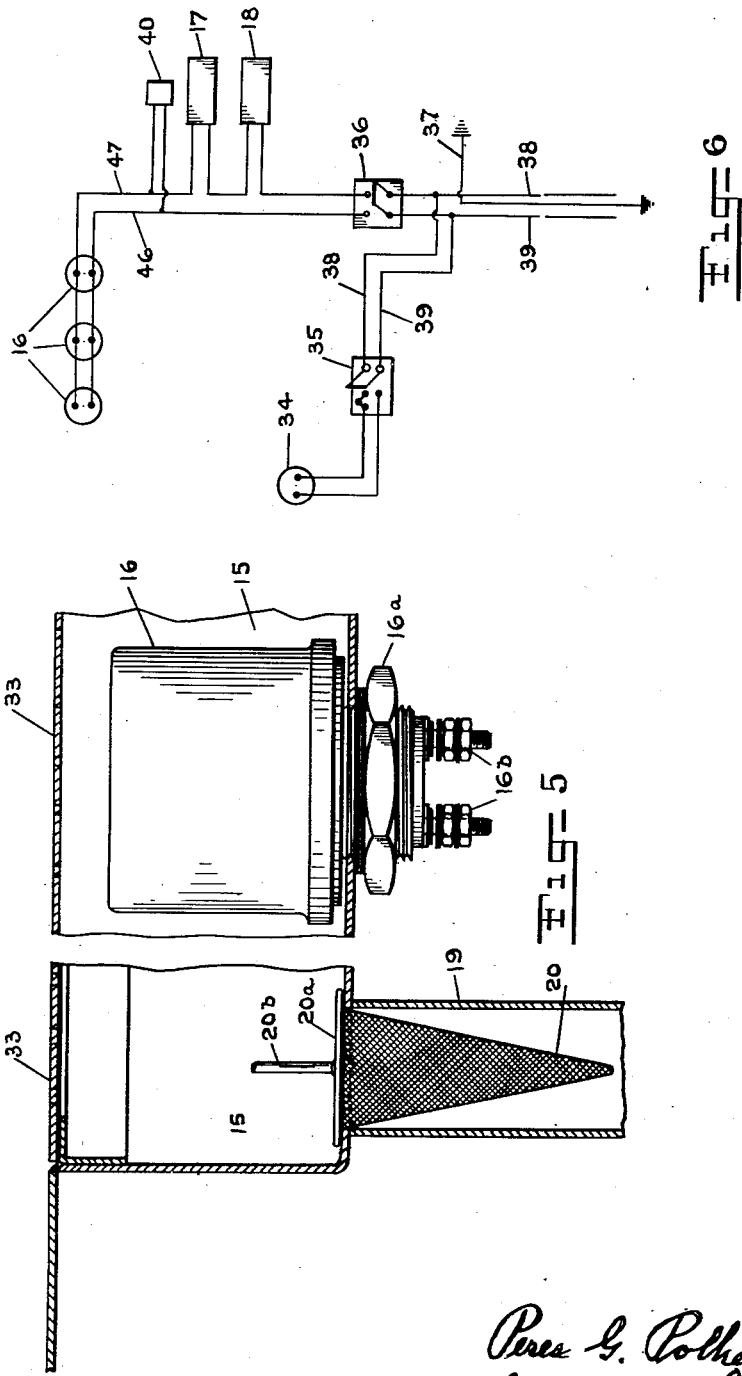

Patented Aug. 10, 1948

2,446,989

UNITED STATES PATENT OFFICE 2,446,989

AUTOMATIC HEAT CONTROLLED APPARATUS FOR PREPARING PADS

Peres G. Polhemus, Roselle, N. J.

Application April 27, 1945, Serial No. 590,656

5 Claims. (Cl. 219—38)

My invention relates to an improvement in an automatic heat controlled apparatus for preparing pads for poliomyelitis treatment and its novelty consists in the adaptation and combination of parts as will be hereinafter more fully pointed out.

In treating poliomyelitis by the Kenney method with pads heated in water to about 210° F. it has always been an impossible task to supply these at the bedside of the patients being treated rapidly, easily and with proper heat control.

These problems have all been solved for the first time by my improved unitary apparatus which not only positively controls the heat of the water and pads and the wringing out of same by a power driven wringer, but also makes this safe, easy, rapid and continuous by the bedside of the patients to be treated.

Referring to the drawings, Figure 1 is a front elevation of my complete device;

Figure 2 is a side elevation of the same;

Figure 3 is a vertical section on the line A—A of Figure 2 with wringer portion removed;

Figure 4 is a sectional plan view on the line B—B of Figure 1 with cover broken away to show interior;

Figure 5 is a side elevation of the detail of the strainer element and heating unit;

Figure 6 is a plan view of the wiring diagram and connections.

In the drawings 10 is a cylindrical body having a tank 11 of stainless steel rigidly mounted in the upper portion of the same with a heavy insulating packing 12 of any suitable insulation material between said body 10 and said tank 11 and an open top 13 with a downturned edge 14 around the inside edge.

In the bottom of the tank 11 is a well 15 in which are rigidly mounted three Chromolox type electrical heating units 16 of well known construction each by means of a large screw nut 16ª and having two terminal connecting posts 16ᵇ for electrical power connections. A drain pipe 19 is connected to the bottom at one end of said well 15 and a fine mesh conical strainer 20 is mounted in the opening of said drain 19 so as to prevent lint getting into the pump and it has integral therewith a cover 20ª and a looped handle 20ᵇ. A further perforated strainer cover 33 is mounted over the entire well 15 to prevent lint and other particles from getting into the heating units 16 and drain 19.

A high temperature thermo-switch 17 of standard construction operating at a temperature of 210° F. is rigidly mounted in the bottom of tank 11 and a low temperature thermo-switch 18 of similar construction operating at a temperature of 100° F. is also rigidly mounted alongside of thermo-switch 17.

In the lower part 10ª of the cylindrical body 10 is rigidly mounted a pump (not shown) of usual construction for pumping the water from the tank 11 at the end of an operation and said pump is operated in the usual well known manner by an electric motor (not shown) also rigidly mounted in the lower part 10ª of the body 10 and which has an overload relay of usual construction to prevent burning out same in case of an overload.

The body 10 is supported by four legs 21 rigidly secured thereto and which have castors 21ª of usual construction attached to their lower end which have unusually large wheels 21ᵇ with rubber tires 22 to insure easy transport and a handle 24 is rigidly secured to the front pair of legs 21 so that the complete apparatus can be readily pushed and steered to and from wherever it may be desired. Foot operated brakes 23 of usual construction are mounted on each of the two front wheels 21ᵇ so that they can be locked in position to prevent accidental movement of the apparatus while in use at the bedside of the patient being treated.

A power driven wringer 25 is mounted in a fixed position in the subframe 26 of the body 10 and has two rollers 27 and 28 with flexible outer coverings of usual construction and which are driven from the electric motor (not shown) in the usual manner by means of shafts and gears (not shown). The wringer 25 has a feed plate 29 and which is similar to the ordinary gable roof form with a floor 30 and gutter 30ª and is adapted to feeding the pads up between the rollers 27 and 28 on one side and down therefrom on the other. A drip pan 31 is rigidly mounted thereunder so that any water from the floor 30 or pad 32 being fed therethrough will run back into tank 11 and insure the clean and dry operation of my apparatus at the bedside of the patients being treated.

In the diagram shown in Fig. 6 of the electric wiring and connections 34 is the electric motor and I prefer to use a 115 volt A. C. 60 cycle single phase 4.8 amps. full load, but others may be found to serve equally well. 35 is a switch of Sentinel Breaker type or some similar type of switch and 36 is a double pole switch or some similar type and 37 is the usual ground wire to protect the operator of apparatus in case of any electric leakage. 38 and 39 are the two sides of the circuit wiring which connect the said motor 34 with the heating units 16, thermo-switches 17 and 18 and switches 35 and 36 and a light 40 which indicates that the power is on and that the motor is in operation.

In the base 10ᵃ of the body 10 as shown in Fig. 2 is the connection of motor 34, the exterior of a box 41 in which indicator light 40 is mounted and switch 35 is adjacent thereto and pump control handle 42 is so mounted that it is connected to switch 35 and as the pump control handle 42 is turned on to put the pump in operation, the switch 35 is simultaneously and necessarily turned off. In other words, to turn on the pump to remove all water from tank 11 the power has to be shut off from the heating units so that over heating and burning out will positively be avoided.

In operating my device the tank 11 is filled with hot water at 100° F. or higher in the usual manner from the hot water faucet in the hospital, where hot water at 140° F. or more must always be available for emergencies. The tank is filled to about one-third full and then the house circuit is plugged into the circuit 38 and 39 at 43 and the switch 35 is turned on so that the motor is set into operation and switch 36 is also set in the on position and the heated elements 16 are in full operation to bring the temperature of the water in tank 11 up to 210° F. Pads 32 will be placed in both sides of tank 11 which is divided by a foraminous plate 44 so that two nurses can each use a different side at the same time until brought to the 210° F. temperature and then the nurse removes them one at a time by means of handling tongs. The wringer 25 is then set in motion by throwing into mesh the gears by means of a control lever 45 so that the rollers 27 and 28 as they rotate and the pads 32 are pushed up on 29 they pass between said rollers 27 and 28 and the excess water runs back into the tank 11 on pan 31. By means of tongs the pad 32 is then placed on the spot to be treated on the patient and immediately wrapped with flannel in the usual Kenney method of treatment.

At the end of a complete period of treatment the electric outlet connection of the house circuits will be disconnected at 43 and the brakes 23 will be released and the operator will push the complete apparatus by means of handle 24 so that it steers readily back to a sink where the electrical connection will be reestablished at 43 and the pump control lever 42 will be turned on which through connection with the switch 36 will turn same off so that the heating units 16 and circuit 47 and 46 will be broken automatically and the water will then be pumped out of the tank 11 to completely empty the same and the heating units 16 will not be in operation.

If during the regular operation of my device the water gets low in the tank 11 the low water thermo-switch 18 will become exposed and thereby cool suddenly and so operate as the temperature goes below 100° F. and will operate to break the circuit 47 and 46 by operating automatically the breaker switch 36 which opens and breaks the circuit 47, 46.

During the regular operation of my device the light 40 will be lit to indicate that the power is on and the heating units 16 are operating but as soon as the breaker switch 36 is opened by the operation of the low water thermo-switch 18 the circuit 46—47 being broken the light 40 will immediately go off indicating the heating units 16 are not operating. Switch 36 will also be operated by the turning on of the pump 42 and as the water will then be removed from tank 11 it is important that the heating units 16 be shut off so as to avoid burning out the electrical circuit from overheating when the water is pumped out and so light 40 will also be off in such operation.

It is therefore clear that my device is in every way a safety operating apparatus which indicates when the heating units are operating and which automatically shuts off the heating units if the water runs low in the tank or if the pump is turned on and the water removed. Also, when the temperature of the water in tank 11 runs over 210° F. the thermo-switch 17 will operate to break the circuit 47 and 46 by operating automatically the breaker switch 36 which opens and so breaks the circuit 47, 46. The daily emptying of said tank is required, as planned, so that water at 100° F. or above will be run into said tank at the beginning of each day's operation.

What I claim is:

1. The combination of a mobile insulated pad heating water tank, electrically operated means in a well in the bottom of said tank for heating the water and pads in said tank, strainers for protecting said heating elements, automatic means for controlling the maximum temperature of said water and the minimum depth of same comprising a thermo switch in said tank operating at 210° F. and a second thermo switch operating when exposed at 100° F.

2. The combination of a mobile insulated pad heating water tank, electrically operated means within said tank for heating the water and pads in said tank, automatic means for controlling the maximum temperature of said water, means for controlling the low water point of said water, an electrically operated wringer for removing excess water from said pads and means for running said excess water back into said tank for further use.

3. The combination in a single mobile unit of means for heating in water a large number of pads for physical therapy treatment of poliomyelitis simultaneously by a plurality of nurses, means for attaining and maintaining the required temperature of said water and pads, automatic means for shutting off the heating elements at a predetermined depth of said water and power operated means for removing the excess water from said pads for reuse.

4. In a single mobile unit, the combination of an insulated tank, means in said tank for heating water and pads to 210° F. and sustaining said maximum temperature, means in said tank for shutting off said heating means automatically when the depth of water in said tank goes below a predetermined depth, means on said tank for removing the excess water from said pads for physical therapy use by a plurality of nurses.

5. The combination in a mobile unit for heating pads for poliomyelitis, of an insulated water tank, a well in the bottom of said tank, electrical heating units in said well for maintaining water in said tank at 210° F., a strainer over said well to protect said heating units, a foraminous plate dividing said tank into a plurality of working compartments, a thermo switch regulating said water temperature at 210° F., a second thermo switch shutting off the electrical heating units upon exposure of said second thermo switch to the air.

PERES G. POLHEMUS.

REFERENCES CITED

The following references are of record in the file of this patent:

UNITED STATES PATENTS

| Number | Name | Date |
| --- | --- | --- |
| 1,170,712 | Trombley | Feb. 8, 1916 |
| 1,696,718 | Kuhlmann et al. | Dec. 25, 1928 |
| 1,741,685 | Dunham | Dec. 31, 1929 |
| 1,850,138 | Riall | Mar. 22, 1932 |
| 1,974,302 | Finlayson | Sept. 18, 1934 |
| 1,992,089 | O'Callaghan | Feb. 19, 1935 |
| 2,088,728 | Stranszky | Aug. 3, 1937 |
| 2,143,730 | Frantz et al. | Jan. 10, 1939 |
| 2,196,035 | Shaw | Apr. 2, 1940 |
| 2,208,397 | Shawber et al. | July 16, 1940 |
| 2,248,007 | Michaels | July 1, 1941 |
| 2,322,580 | Lumley | June 22, 1943 |
| 2,338,150 | Wallace | Jan. 4, 1944 |
| 2,340,365 | Cain | Feb. 1, 1944 |
| 2,426,615 | Jokinen | Sept. 2, 1947 |